United States Patent

Osakabe et al.

[11] Patent Number: 5,608,730
[45] Date of Patent: Mar. 4, 1997

[54] BI-DIRECTIONAL COMMUNICATION SYSTEM

[75] Inventors: Yoshio Osakabe, Kanagawa; Shigeo Tanaka, Tokyo; Akira Katsuyama; Hiroshi Yamazaki, both of Kanagawa; Yasuo Kusagaya, Tokyo; Noriko Kotabe, Chiba; Kouichi Sugiyama; Makoto Sato, both of Kanagawa, all of Japan

[73] Assignee: Sony Corporation, Tokyo, Japan

[21] Appl. No.: 170,077

[22] Filed: Dec. 17, 1993

[30] Foreign Application Priority Data

Dec. 21, 1992 [JP] Japan ................................. 4-340405
Oct. 21, 1993 [JP] Japan ................................. 5-263651

[51] Int. Cl.$^6$ ........................................................ H04J 3/14
[52] U.S. Cl. ...................... 370/471; 370/522; 340/825.5; 395/288; 348/13
[58] Field of Search .......................... 370/85.1, 60, 94.1, 370/94.2, 85.2, 85.3, 92, 79, 82, 110.1; 340/825.5, 825.51; 395/287, 288

[56] References Cited

U.S. PATENT DOCUMENTS

| | | | |
|---|---|---|---|
| 5,031,175 | 7/1991 | Tanaka et al. | 370/85.1 |
| 5,249,182 | 9/1993 | Van Steenburgge et al. | 370/85.2 |
| 5,319,642 | 6/1994 | Ota | 370/85.3 |
| 5,343,469 | 8/1994 | Oshima | 370/85.1 |
| 5,473,606 | 12/1995 | Hoekstra | 370/85.2 |

FOREIGN PATENT DOCUMENTS

| | | |
|---|---|---|
| 0333269 | 3/1989 | European Pat. Off. . |
| 0350838 | 7/1989 | European Pat. Off. . |
| 0461674 | 6/1991 | European Pat. Off. . |

Primary Examiner—Douglas W. Olms
Assistant Examiner—Seema Rao
Attorney, Agent, or Firm—Pasquale Musacchio, Esq.; Robert P. Biddle, Esq.; Jerry A. Miller

[57] ABSTRACT

There is disclosed a communication system using a bi-directional bus, which includes a plurality of devices (e.g., TV image receiver or video tape recorder, etc.) connected to each other. Each device includes a transmit signal formation unit having a frame structure including an address field for specifying addresses of devices between which communication is carried out, a control field for specifying whether communication is carried out in the state where device on the receiving side is locked or in the state where that device is unlocked, and a data field for specifying data to be transmitted. For transmitting data having a data quantity greater than data capacity of the data field, the data is divided into a plurality of frames, an indication to lock device on the receiving side is given to control field of a frame transmitted first, and an indication to unlock that device is given to control field of a frame transmitted last. The transmit signal thus indicated is transmitted through the bi-directional bus by a bus output unit. In addition, there are also disclosed a transmitting method, a receiving method and a communication method, which can be applied to such a bi-directional bus system.

6 Claims, 15 Drawing Sheets

| Bit number | Meaning | |
|---|---|---|
| 7 | Always 0 | |
| 6 | Reserved for future standardization, "1" | |
| 5, 4 | Source service code | 00 ; CT |
| | | 01 ; AV/C |
| | | 10 ; HK |
| | | 11 ; reserved |
| 3, 2 | Destination service code | 00 ; CT |
| | | 01 ; AV/C |
| | | 10 ; HK |
| | | 11 ; reserved |
| 1 | 1/0 without/with SSDA | |
| 0 | 1/0 without/with DSDA | |

| P1 (VTR → TV) | |
|---|---|
| HEADER | HEADER |
| MASTER ADDRESS BITS | VTR |
| SLAVE ADDRESS BITS | TV |
| CONTROL BITS | COMMAND/LOCK |
| OPC | "Begin2" |
| OPR | "54" h |
| SSDA | VIDEO DECK |
| DSDA | TV MONITOR |
| OPC | "E0" h |
| OPR1 | "20" h |
| OPR2 | "22" h |
| OPR3 | "21" h |

| P2 (VTR → TV) | |
|---|---|
| HEADER | HEADER |
| MASTER ADDRESS BITS | VTR |
| SLAVE ADDRESS BITS | TV |
| CONTROL BITS | DATA/LOCK |
| DATA #1 | DATA |
| . . . . . . . . . | . . . . . . . . . |
| (MAX 32) | |

| P3 (VTR → TV) | |
|---|---|
| HEADER | HEADER |
| MASTER ADDRESS BITS | VTR |
| SLAVE ADDRESS BITS | TV |
| CONTROL BITS | COMMAND/NON-LOCK |
| OPC | END |

FIG. 6

| MSB | | | | | | | LSB | |
|---|---|---|---|---|---|---|---|---|
| b7 | b6 | b5 | b4 | b3 | b2 | b1 | b0 | |
| 0 | * | * | * | * | * | | | 00 : DISABLE<br>01 : COMMUNICATION FROM SUB-DEVICE TO DEVICE<br>10 : COMMUNICATION FROM DEVICE TO SUB-DEVICE<br>11 : COMMUNICATION FROM DEVICE TO DEVICE |

P1 (VTR → TV)

| HEADER | HEADER |
|---|---|
| MASTER ADDRESS BITS | VTR |
| SLAVE ADDRESS BITS | TV |
| CONTROL BITS | DATA/ LOCK |
| TEXT HEADER | "AB" h |
| HDOPR | SUB-DEVICE → DEVICE |
| SSDA | VIDEO DECK |
| DTATR | "20" h |
| BYTE | "2A" h |
| OPR1 | "20" h |
| OPR2 | "22" h |
| OPR3 | "21" h |
| DATA #9 | DATA |
| ... | ... |
| DATA #16 | DATA |

P2 (VTR → TV)

| HEADER | HEADER |
|---|---|
| MASTER ADDRESS BITS | VTR |
| SLAVE ADDRESS BITS | TV |
| CONTROL BITS | DATA/ NON-LOCK |
| TEXT HEADER | "AB" h |
| HDOPR | SUB-DEVICE → DEVICE |
| SSDA | VIDEO DECK |
| DTATR | "20" h |
| BYTE | "27" h |
| DATA #6 | DATA |
| ... | ... |
| DATA #13 | DATA |

P3 (VDP → TV)

| HEADER | HEADER |
|---|---|
| MASTER ADDRESS BITS | VDP |
| SLAVE ADDRESS BITS | TV |
| CONTROL BITS | DATA/ NON-LOCK |
| TEXT HEADER | "AB" h |
| HDOPR | SUB-DEVICE → DEVICE |
| SSDA | VIDEO PLAYER |
| DTATR | "20" h |
| BYTE | "2A" h |
| OPR1 | "20" h |
| OPR2 | "22" h |
| OPR3 | "21" h |
| DATA #9 | DATA |
| ... | ... |
| DATA #16 | DATA |

P1 (VTR → TV)

| | |
|---|---|
| HEADER | HEADER |
| MASTER ADDRESS BITS | VTR |
| SLAVE ADDRESS BITS | TV |
| CONTROL BITS | DATA/ NON-LOCK |
| TEXT HEADER | "AB" h |
| HDOPR | SUB-DEVICE → DEVICE |
| SSDA | VIDEO DECK |
| DTATR | "20" h |
| BYTE | "2A" h |
| OPR1 | "20" h |
| OPR2 | "21" h |
| OPR3 | "20" h |
| DATA #9 ⋮ DATA #16 | DATA ⋮ DATA |

P2 (VDP → TV)

| | |
|---|---|
| HEADER | HEADER |
| MASTER ADDRESS BITS | VDP |
| SLAVE ADDRESS BITS | TV |
| CONTROL BITS | DATA/ NON-LOCK |
| TEXT HEADER | "AB" h |
| HDOPR | SUB-DEVICE → DEVICE |
| SSDA | VIDEO PLAYER |
| DTATR | "20" h |
| BYTE | "2A" h |
| OPR1 | "20" h |
| OPR2 | "21" h |
| OPR3 | "20" h |
| DATA #9 ⋮ DATA #16 | DATA ⋮ DATA |

FIG.14

BI-DIRECTIONAL COMMUNICATION SYSTEM

BACKGROUND OF THE INVENTION

1. Field of the Invention

This invention relates to a transmitting method, a receiving method, a communication method, and a bi-directional bus system, which are used in a system in which devices, e.g., a television image receiver or a video tape recorder, etc. are connected to each other by using a bi-directional bus so that one of the devices can control other devices or sub-devices, e.g., a monitor image receiver, a TV tuner, or a video deck, etc. included in the other devices, or can display the operating states, etc. the other devices on the television image receiver.

2. Description of the Related Art

In recent years, there have been popularly used systems in which a plurality of audio equipments or visual equipments (hereinafter referred to as AV equipments) are with each other by means of video signal lines or audio signal lines (hereinafter referred to as AV signal lines) so that they are used as an AV system.

In such AV systems, equipments are connected by means of a system control bus (hereinafter simply referred to as a bi-directional bus) in addition to the above-described AV signal lines to control respective equipments. In a practical sense, Audio, Video and audiovisual systems Domestic Digital Bus (hereinafter referred to as D2B) standardized by the so-called publication 1030 of IEC, a Home Bus System (hereinafter referred to as HBS) standardized by the ET-2101 of EIAJ, and the like are known. Through the bi-directional bus, other devices are controlled from other equipments (devices), e.g., a television image receiver, a video tape recorder, and a video deck player (hereinafter respectively referred to as TV, VTR, VDP), etc., or sub-devices, e.g., a monitor image receiver (TV monitor), a TV tuner, a video deck, or an amplifier, etc. included in the devices are controlled from the other devices. Further, through the bi-directional bus, data for displaying, on a TV monitor, e.g., the operating state (status) of device or sub-device is transmitted. In addition, as an access system of the bi-directional bus, so called CSMA/CD (Carrier Sense Multiple Access with Collision Detection) is employed in, e.g., D2B.

Namely, four types of communication are carried out through the bi-directional bus communication from a sub-device included in a device to a sub-device included in any other device (hereinafter referred to as communication from sub-device to sub-device), communication from a sub-device included in a device to any other device (hereinafter referred to communication from sub-device to device), communication from a device to a sub-device included in any other device (hereinafter communication from device to sub-device), and communication from a device to any other device The format of a transmit signal used in a bi-directional bus as described above, e.g., D2B will now be described. In D2B, control commands for controlling a sub-device of destination, etc. or data indicating the operating state, etc. are caused to have a frame configuration as shown in FIG. 1, and are transmitted through the bi-directional bus.

Namely, one frame of the data consists of a header field 101 for specifying a header indicating a leading portion of the frame, a master address field 102 for specifying a master device address, a slave address field 103 for specifying a slave (receiving side) device address, a control field 104 for specifying control bits indicating whether communication is made while the slave device is locked, or is unlocked, and a data field 105 for specifying control commands or data.

The header of the header field 101 consists of, as shown in FIG. 2, a start bit 101a of one bit for providing synchronization, and mode bits 101b for prescribing a transmission speed (rate) or the number of bytes of the data field 105. These mode bits 101b are 1~3 bits. At present, there are three standardized modes of mode 0 where the data field 105 is comprised of 2 bytes at the maximum, mode 1 where the data field 105 is comprised of 32 bytes at the maximum (16 bytes at the maximum in the case of communication from slave to master), and mode 2 where the data field 105 is comprised of 128 bytes at the maximum (64 bytes at the maximum in the case of communication from slave to master).

The master device address of the master address field 102 consists of, as shown in the above-mentioned FIG. 2, master address bits 102a of 12 bits for specifying a master device address, and a parity bit 102b of 1 bit.

The slave device address of the slave address field 103 consists of, as shown in the above-mentioned FIG. 2, a slave address bits 103a of 12 bits for specifying a slave device address, a parity bit 103b of 1 bit, and an acknowledge bit 103c of 1 bit acknowledging the receipt of data from a slave device.

As shown in the above-mentioned FIG. 2, control bits 104a of 4 bits indicating the communication direction of control commands or data, or indicating lock state or unlock state, a parity bit 104b of 1 bit, and an acknowledge bit 104c of 1 bit are assigned to the control field 104.

In the data field 105, as shown in the above-mentioned FIG. 2, data bits 105a of 8 bits, end of data bit 105b of 1 bit, parity bit 105c of 1 bit, and acknowledge bit 105d of 1 bit are repeated as many as necessary. Assuming now that data bits 105a include data #1, #2, #3, . . . in this order from the beginning, in communication of, e.g., control commands, e.g., Operation code (hereinafter referred to as OPC) "Begin 2" (i.e., code "BD"h (h represents hexadecimal number)) indicating communication relating to sub-device, OPC "Begin 1" ("BC"h) indicating communication through HBS, and OPC "Begin 0" ("BB"h) indicating communication through other bus, etc. are all assigned (allocated) to data #1. Further, e.g., for communication of data, data are assigned to data #1, #2 #3 . . . each having a byte (8 bits).

OPR with respect to the above-described OPCs, e.g., OPR with respect to OPC "begin 2" consists of, as shown in FIG. 3, bits b5, b4, b3, b2 (b7 is the Most Significant Bit (MSB) for identifying service codes of the Communication Telephony (CT) system, the Audio Video and Control (AV/C) system, and the Housekeeping (HK) system, etc., and bits b1, b0 indicating any one of communication from sub-device to sub-device, communication from sub-device to device, communication from device to sub-device, and communication from device to device, viz., indicating presence or absence of Source Sub-Device Address (hereinafter referred to as SSDA) or Destination Sub-Device Address (hereinafter referred to as DSDA). It is to be noted that bit b7 is caused to be always zero, and bit b6 is reserved for future standardization and is caused to be 1 at present. In more practical sense, b1=0, b0=0 indicates communication from sub-device to sub-device; b1=0, b0=1 indicates communication from sub-device to device; b1=1, b0=0 indicates communication from device to sub-device; and b1=1, b0=1 indicates communication from device to device.

For transmitting data having a data quantity greater than a data capacity of the data field 105 in unlock state from VTR to TV, the data is divided into 2 frames, for example, VTR constitutes, as shown in FIG. 4, two frames (so called a packet) P1, P2 in which master address bits are an address of VTR, slave address bits are caused to be an address of TV, control bits are a code (e.g., "F"h) indicating writing data in unlock state, and data are assigned to data #1, #2, #3 . . . . Then, VTR detects presence or absence of so called a carrier on the bi-directional and VTR transmits frame P1 when there is no carrier, i.e., the bi-directional bus is open. After sending frame P1 VTR stops sending of carrier to open the bi-directional bus. When the bi-directional bus is open for a second time, VTR transmits frame P2. Thus, transmission of data from VTR to TV is completed. TV carries out display of characters based on this data transmitted from VTR.

Suppose that VDP waits until the bi-directional bus is opened for transmitting data to TV while VTR is transmitting frame P1, as shown in the above-mentioned FIG. 4. When VTR completes transmission of frame P1 thereafter to stop sending of carrier, VDP detects that there is no carrier on the bi-directional bus and acquires the right of use of the bi-directional bus to transmit, to TV, a frame P3 in which master address bits, slave address bits, and control bits are respectively a VDP address, a TV and code "F"h (data/ unlock), and data are assigned to data #1, #2, #3 . . . . When transmitting operation of VDP is completed, VTR transmits frame P2. Namely, since VTR does not place TV in lock state, frame P1 from VTR, frame P3 from VDP and frame P2 from VTR are received this order by TV. Since master address bits for identifying a master device are added to these frames, there is no possibility of error in transmission, i.e., no message data from VTR and VDP may be mixed. However, when data for display is sent from VDP to TV for a time period during which VTR also sends data to TV to display status of VTR on the screen of TV, there is the possibility that there may take place an inconvenience such that display of VDP breaks into display of VTR or a TV screen, or it takes much time in display of character, etc.

In view of this, in the conventional bi-directional bus system, as shown in FIG. 5, a master device allows a slave (receiving side) device to be placed in lock state to carry out transmission of data. Namely, e.g., VTR transmits a frame P1 in which master address bits are an address of VTR, slave address bits are an address of TV, control bits are code "A"h indicating write of control command in lock state. OPC "Begin 2", code "54"h indicating presence of SSDA and DSDA, address of, e.g., video deck, address of, e.g., TV monitor code, code "E0"h indicating display, "20"h indicating, e.g., the first line on screen, code "22"h indicating, e.g., letter (character) of the standard size, and code "21"h indicating, e.g., a use of lower case character of the alphabet are respectively assigned to data #1 (OPC), data #2 (OPR), data #3 (SSDA), data #4 (DSDA), data #5 (OPC), data #6 (OPR1), data #7 (OPR2), and data #8 (OPR3), thus to carry out control to lock TV. It is to be noted that SSDA and DSDA are assigned if necessary. For example, for communication from sub-device to device, DSDA is unnecessary. For communication from device to sub-device, SSDA is unnecessary. For communication from device to device, SSDA and DSDA are unnecessary.

Then, VTR transmits a frame P2 in which master address bits, slave address bits, and control bits are respectively an address of VTR, address of TV, and code "B"h indicating write of data in lock state, and data of, e.g., 32 bytes at the maximum are assigned to data #1, #2, #3 . . . . This operation is continued until a line displayed is changed.

Then, in order to give an instruction of line change, VTR transmits a frame Pi in which master address bits, slave address bits, and control bits are respectively an address of VTR, an address of TV and code "A"h (command/lock), and code "E0"h, code "21"h indicating, e.g., second line on the screen, code "21"h indicating, a use of large letter (character), and code "20"h indicating, a use of capital of alphabet are respectively assigned to data #1 (OPC), data #2 (OPR1), data #3 (OPR2) and data #4 (OPR3). Then, VTR transmits a frame Pi+1 in which master address bits, slave address bits and control bits are respectively an address of VTR, an address of TV and code "B"h (data/lock), and the remaining data are assigned to data #1, #2, #3 . . . .

Thereafter, VTR transmits a frame Pi+2 in which master address hits, slave address hits and control .hits are an address of VTR, an address of VTR, address of TV and code "E"h indicating write of control command in unlock state, respectively. End command (code "BE"h) indicating that message (data communication) has been completed is assigned to data #1 (OPC) to release lock of TV.

When VTR completes transmission of frame P2 to stop sending of carrier VDP acquires the right of use of the bi-directional bus. VDP transmits data to TV to transmit a frame Pj in which master address hits, slave address hits and control hits are respectively an address of VDP, an address of TV and code "A"h (command/lock). and OPC "Begin 2", code "54"h, address of, e.g., video player, address of, e.g., TV monitor, code "E0"h, code "20" (first line), code "22"h (standard letter (character)), and code "21"h (small letter (character) of alphabet are respectively assigned to data #1 (OPC), data #2 (OPR), data #3 (SSDA), data #4 (DSDA), data #5 (OPC), data #6 (OPR1), data #7 (OPR2) and data #8 (OPR3), TV informs VDP that it is locked by VTR. Thus, VDP stops transmission of data. As a result, transmission of data from VTR to TV is continued without being interrupted by VDP.

When transmission of data from VTR to TV is completed, as shown in the above-mentioned FIG. 5, VDP transmits frame Pj to TV for a second time to place TV in lock state. Then, VDP transmits frame Pj+1 in which master address bits, slave address bits and control bits are respectively an address of VDP, an address of TV and code "B"h (data/lock), and data are assigned to data #1, #2, #3 . . . . Then, VDP transmits a frame Pj+2 in which master address bits, slave address bits and control bits are an address of VDP, an respectively address of VDP, address of TV and code "E"h (command/non-lock) and code "BE"h (end command) is assigned to data #1 (OPC) to unlock TV.

Thus, data transmission from VTR to TV and data transmission from VDP to TV are completed. In accordance with such a transmission procedure, the conventional bi-directional bus system solves the above-described problem that display of VDP breaks into display of VTR on a TV screen.

However, even when a data quantity of data to be transmitted is less than data capacity of data field 105, and data can be transmitted in a single frame, the conventional bi-directional bus system places a slave (receiving side) device in lock state, and unlock the slave device when transmission of data is completed.

Namely, as shown in FIG. 6, VTR transmits a frame P1 in which master address bits, slave address bits and control bits are respectively an address of VTR, an address of TV and code "A"h (command/lock), and OPC "Begin 2", code "54"h, address of video deck, address of TV monitor, code "E0"h, code "20"h, code "22"h and code "21"h are respectively assigned to data #1 (OPC), data #2 (OPR), data #3

(SSDA), data #4 (DSDA), data #5 (OPC), data #6 (OPR1), data #7 (OPR2), and data #8 (OPR3) so that TV is placed in lock state.

Then, VTR transmits a frame P2 in which master address bits, slave address bits, and control bits are respectively an address of VTR, an address of TV and code "B"h (data/ lock), and data are assigned to data #1, #2, #3 . . . .

Thereafter, VTR transmits a frame P3 in which master address bits, slave address bits and control bits are respectively an address of VTR, an address of TV and code "E"h (command/lock), and code "BE"h (end command) indicating that message is completed is assigned to data #1 (OPC) to unlock TV.

As stated above, in the conventional communication method or bi-directional bus system, before actual data is transmitted, a frame for allowing a device on the receiving side to be placed in lock state is required, and another frame is necessary for allowing the device on the receiving side to be placed in unlock state at the time when transmission of data is completed, resulting in the problems that a data traffic quantity is increased, the transmission efficiency is low, and the communication procedure (protocol) is complex, etc.

OBJECT AND SUMMARY OF THE INVENTION

This invention has been made in view of actual circumstances as stated above, and its object is to provide a transmitting method, a receiving method and a communication method for a bi-directional bus system, and a bi-directional bus system.

To achieve the above-mentioned object, a first transmitting method according to this invention is directed to a transmitting method for a bi-directional bus system in which a plurality of devices are connected to each other through a bi-directional bus, wherein one frame of a transmit signal on the bi-directional bus consists of an address field for specifying addresses of devices between which communication is carried out, a control field for specifying whether communication is carried out in the state where a device on the receiving side is locked, or in the state where the device on the receiving side is not locked, and a data field for specifying data to be transmitted, and wherein, for transmitting data having a data quantity greater than data capacity of the data field with the data being divided into a plurality of frames, the transmitting method comprises:

giving an indication to lock a device on the receiving side to the control field of a frame transmitted first;

giving an indication to unlock the device on the receiving side to the control field of a frame transmitted last; and transmitting the transmit signal through the bi-directional bus.

Further, a second transmitting method according to this invention is, in the first transmitting method, in that for transmitting data having a data quantity not greater than a data capacity of the data field by one frame, the transmitting method comprises:

giving an indication to unlock a device on the receiving side to the control field; and transmitting the transmit signal through the bi-directional bus.

Further, a receiving method according to this invention is directed to a receiving method for a bi-directional bus system in which a plurality of devices are connected to each other through a bi-directional bus, the receiving method comprising:

receiving, through the bi-directional bus, a transmit signal having a frame structure consisting of an address field for specifying address of devices between which communication is carried out, a control field for specifying whether a communication is carried out in the state where a device on the receiving side is locked or in the state where the device on the receiving side is unlocked, and a data field for specifying data to be transmitted, whereby when an indication to lock a device on the receiving side is given to the control field of a transmit signal from a first device, in the case where a transmit signal is received from a second device, the second device is informed through the bi-directional bus that the device on the receiving side is locked.

A communication method according to this invention is directed to a communication method for a bi-directional bus system in which a plurality of devices are connected to each other through a bi-directional bus, a device on the transmitting side being adapted to transmit, through said bi-directional bus, a transmit signal in which one frame on the bi-directional bus consists of an address field for specifying addresses of devices between which communication is carried out, a control field for specifying whether a communication is carried out in the state where a device on the receiving side is locked or in the state where the device on the receiving side is unlocked, and a data field for specifying data to be transmitted;

for transmitting data having a data quantity greater than data capacity of the data field with the data being divided into a plurality of frames, the device on the transmitting being operative to give an indication lock a device on the receiving side to the control field of a frame transmitted first, and to give an indication unlock the device on the receiving side to the control field of a frame transmitted last, thus to transmit the transmit signal through the bi-directional bus, a device on the receiving side being adapted to receive the transmit signal through the bi-directional bus, whereby when the indication to lock the device on the receiving side is given to the data field of a transmit signal received from a first device on the transmitting side, in the case where a transmit signal is received from a second device on the transmitting side, the second device is informed through the bi-directional bus that the device on the receiving side is locked.

A first bi-directional bus system according to this invention comprises a plurality of devices and a bi-directional bus, each of the plurality of device comprising:

transmit signal formation means for forming a transmit signal having a frame structure consisting of an address field for specifying addresses of devices between which communication is carried out, a control field for specifying whether a communication is carried out in the state where a device on the receiving side is locked or in the state where the device on the receiving side is not locked, and a data field for specifying data to be transmitted, whereby, for transmitting data having a data quantity greater than a data capacity of the data field with the data being divided into a plurality frames, the transmit signal formation means is operative to give an indication to lock a device on the receiving side to the control field of a frame transmitted first, and to give an indication to unlock the device on the receiving side to the control field of a frame transmitted last, thus to transmit the transmit signal through the bi-directional bus; and bus output means for outputting the transmit signal formed by the transmit signal formation means to the bi-directional bus, the plurality of devices being connected to each other through the bi-directional bus.

Further, a second bi-directional bus system according to this invention comprises a plurality of devices and a bi-directional bus, each of said plurality of devices comprising:

bus input means adapted to receive, through the bi-directional bus, a transmit signal having a frame structure consisting of an address field for specifying addresses of devices between which a communication is carried out, a control field for specifying whether a communication is carried out in the state where a device on the receiving side is locked or in the state where the device on the receiving side is unlocked, and a data field for specifying data to be transmitted; and control means adapted so that when an indication to lock a device on the receiving side is given to the control field of a transmit signal from a first device received by the input means, in the case where a transmit signal is received from a second device, the second device is informed through the bi-directional bus that the device on the receiving side is locked, the plurality of devices being connected to each other through said bi-directional bus.

In addition, a third bi-directional bus system according to this invention comprises a plurality of devices and a bi-directional bus, each of the plurality of devices comprising:

transmit signal formation means for forming a transmit signal having a frame structure consisting of an address field for specifying addresses of addresses of devices between which a communication is carried out, a control field for specifying whether a communication is carried out in the state where a device on the receiving side is locked or in the state where the device on the receiving side is unlocked, and a data field for specifying data to be transmitted, whereby, for transmitting data having a data quantity greater than data capacity of the data field with the data being divided into a plurality of frames, the transmit signal formation means is operative to give an indication to lock a device on the receiving side to the control field of a frame transmitted first, and to give an indication to unlock the device on the receiving side to the control field of a frame transmitted last, thus to form the transmit signal;

bus output means for outputting the transmit signal formed by the transmit signal formation means to the bi-directional bus;

bus input means adapted to receive the transmit signal through the bi-directional bus; and control means adapted so that when the indication to lock the device on the receiving side is given to the control field of a transmit signal from a first device received by he bus input means, in the case where a transmit signal is received from a second device, the second device is informed that the device on the receiving side is locked, the plurality of devices being connected to each other through the bi-directional bus.

In accordance with the first transmitting method according to this invention, for transmitting data transmitted having a data quantity greater than data capacity of the data field with the data being divided into a plurality frames, an indication to lock a device on the receiving side is given at a frame transmitted first to the control field of a transmit signal consisting of address field, the control field, and data field, and an indication to unlock the device on the receiving side is given at a frame transmittee last to the control field of the transmit signal. The transmit signal thus indicated is transmitted through the bi-directional bus.

In accordance with the second transmitting method according to this invention, for transmitting data having a data quantity not greater than data capacity of the data field, an indication to unlock device on the receiving side is given to the control field of a transmit signal to transmit the transmit signal thus indicated through the bi-directional bus.

In accordance with the receiving method, a transmit signal consisting of address field, control field and data field and such that an indication to carry out communication either in the state where a device on the receiving side is locked or in the state where the device on the receiving side is unlocked is given to the control field is received through the bi-directional bus. When an indication to lock device on the receiving side is given to the control field of a transmit signal from a first device, in the case where a transmit signal is received from a second device, the second device is informed through the bi-directional bus that the device on the receiving side is locked.

Further, in accordance with the communication method, device on the transmitting side is such that, for transmitting data having a data quantity greater than data capacity of the data field with the data being divided into a plurality of frames, the device is operative to give an indication to lock a device on the receiving side at a frame transmitted first to control field of a transmit signal consisting of address field, control field and data field and to give an indication to unlock the device on the receiving side at a frame transmitted last to the control field of the transmit signal to transmit the transmit signal through the bi-directional bus. On the other hand, device on the receiving side receives the transmit signal through the bi-directional bus, whereby when the indication to lock device on the receiving side is given to the control field of transmit signal received from a device on the transmitting side, in the case where a transmit signal is received from a second device on the transmitting side, the second device is informed through the bi-directional bus that the device on the receiving side is locked.

Further, in accordance with the first bi-directional bus system, each transmit signal formation means of a plurality of devices is such that, for transmitting data having a data quantity greater than the data capacity of the data field with the data being divided into a plurality of frames, the transmit signal formation means is operative to give an indication to lock device on the receiving side at a frame transmitted first to control field of a transmit signal consisting of address field, control field data field and to give an indication to unlock device on the receiving side of a frame transmitted last, thus to form transmit signal. The bus output means outputs this transmit signal to the bi-directional bus.

Further, in accordance with the second bi-directional bus system, each bus input means of a plurality of devices receives, through bi-directional bus, a transmit signal consisting of address field, control field and data field and such that an indication to carry out communication either in the state where device on the receiving side is locked or in the state where device on the receiving side is unlock is given to the control field. Control means operate so that when indication to lock device on the receiving side is given to the control field of the received transmit signal from a first device, in the case where a transmit signal is received from a second device, the second device is informed that the device on the receiving side is locked.

In addition, in accordance with the third bi-directional bus system, each transmit signal formation means of a plurality of devices is such that, for transmitting data having a data quantity greater than the data capacity of the data field in a manner divided into a plurality of frames, this means is operative to give an indication to lock device on the receiving side at a frame transmitted first to control field of a transmit signal consisting of address field, control field and data field, and to give an indication to unlock device on the receiving side at a frame transmitted last to the control field of the transmit signal, thus to form transmit signal. Bus input means outputs this transmit signal to bi-directional bus. Each input means of a plurality of devices receives transmit signal through the bi-directional bus. Control means operates to that when indication to lock device on the receiving side is given to the control field of a transmit signal from a first device, in the case where a transmit signal is received from a second device, the second device is informed through the bi-directional bus that device on the receiving side is locked.

BRIEF DESCRIPTION OF THE DRAWINGS

FIG. 3 is a view for explaining OPR of OPC "Begin 2".

Figure 5:
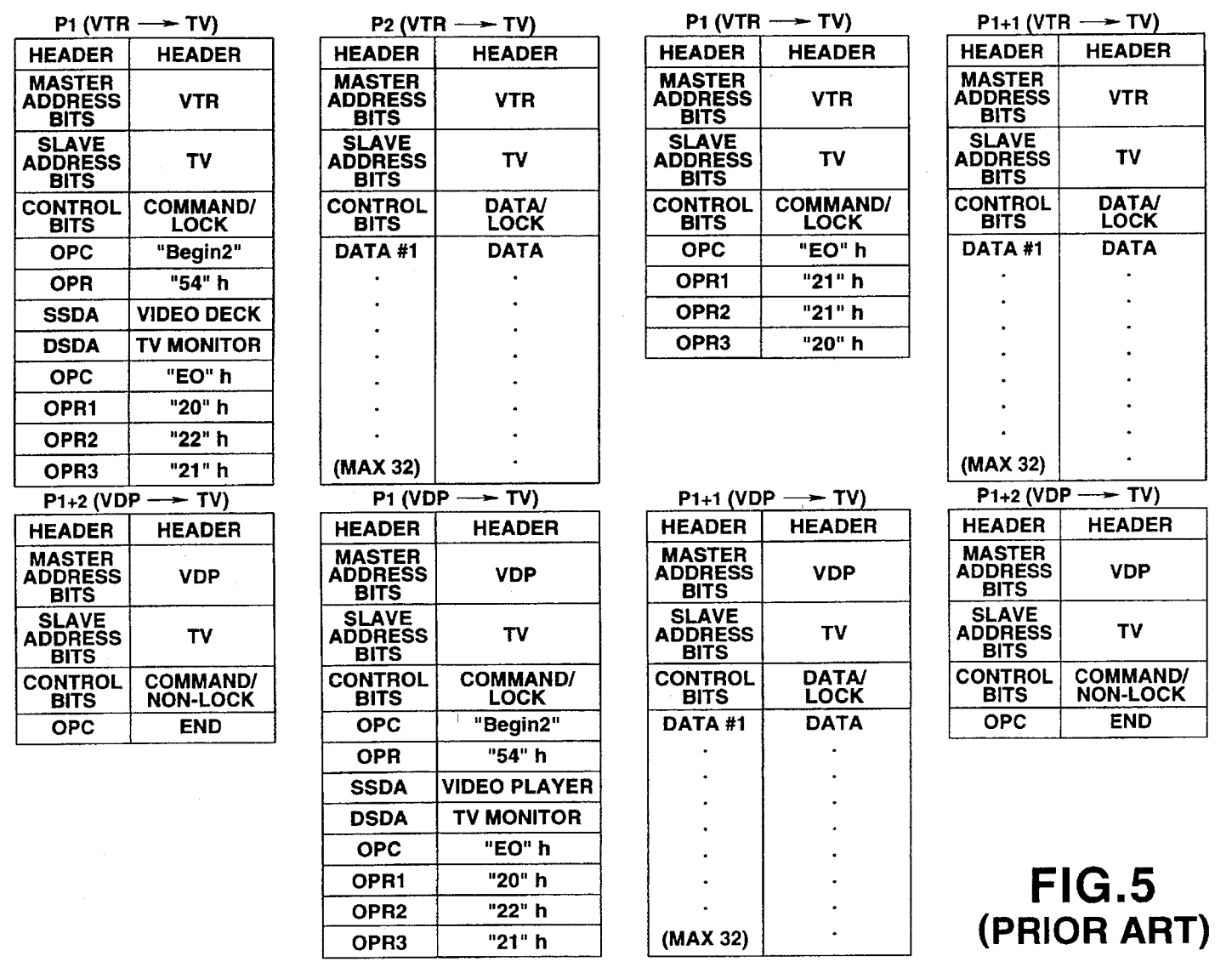

FIG. 5 is a view showing a conventional communication procedure (protocol) in lock-state.

FIG. 6 is a view showing a conventional communication procedure (protocol) when transmission is carried out in a single frame in lock state.

FIG. 12 is a view showing a format of HDOPR of a transmit signal.

FIG. 13 is a view showing an actual example of a communication procedure when communication is carried out with data being divided into a plurality of frames.

FIG. 14 is a view showing an actual example of a communication procedure when data communication is carried out in a single frame.

DESCRIPTION OF THE PREFERRED EMBODIMENT

A preferred embodiment of a transmitting method, a receiving method, and a communication method for a bi-directional bus system and a bi-directional bus system will now be described with reference to the attached drawings. In the embodiment, this invention is applied to D2B (Audio, Video and audiovisual systems Domestic Digital Bus) standardized by the publication 1030 of the so-called IEC, or a Home Bus System (hereinafter abbreviated as HBS) standardized by ET-2101 of EIAJ.

Figure 7:
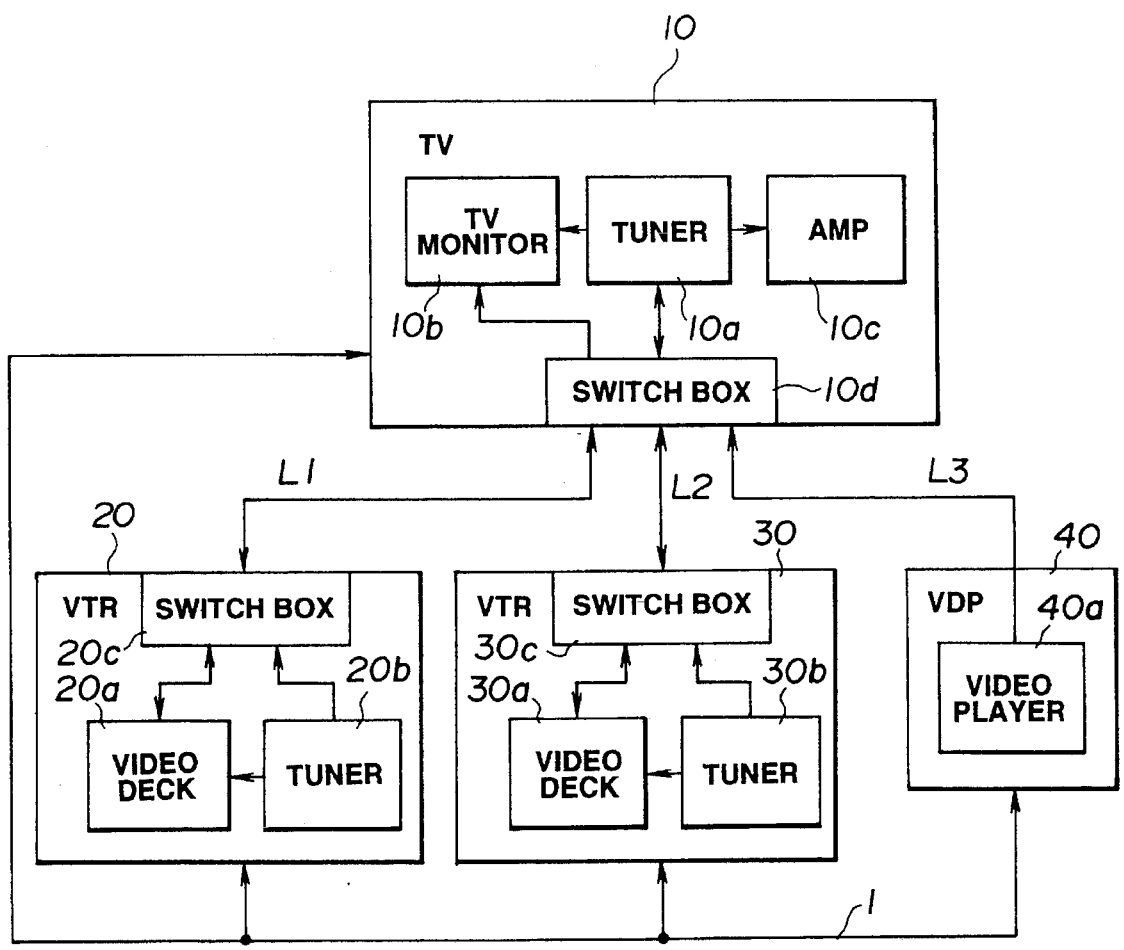
FIG. 7 is a block diagram showing an actual configuration of a bi-directional bus system to which this invention is applied.

A bi-directional bus system to which this invention is applied has a configuration such that a television image receiver (hereinafter abbreviated as TV) 10 which is a device, video tape recorders (hereinafter each abbreviated as VDP) 20, and 30 which are devices, and a video deck player (hereinafter abbreviated as VDP) 40 which is a device are connected to each other through a bi-directional bus 1, as shown in FIG. 7, for example.

The TV10 includes therein, as a sub-device, as shown in the above-mentioned FIG. 7, a tuner 10a for receiving a television (broadcasting) signal to reproduce a video signal and an audio signal therefrom, a TV monitor 10b for displaying a picture based on the video signal reproduced at the tuner 10a, and an amplifier 10c for amplifying the audio signal reproduced by the tuner 10a. TV10 also includes as a sub-device, a switch box 10d for outputting to the external a video signal/audio signal (hereinafter referred to as an AV signal) from the tuner 10a, or delivering the AV signal inputted from the external to the tuner 10a and the TV monitor 10b.

Further, the VTR20 includes as a sub-device therein, as shown in the above-mentioned FIG. 7, a video deck 20a for recording an AV signal onto a magnetic tape, or reproducing the AV signal therefrom, and a tuner 20b for receiving a television (broadcasting) signal to reproduce an AV signal therefrom. VTR20 also includes, as a sub-device, a switch box 20c adapted for outputting an AV signal from the video deck 20a or the tuner 20b to the external, or delivering an AV signal inputted from the external to the video deck 20a.

Further, the VTR30 includes therein, as a sub-device, a video deck 30a, a tuner 30b, and a switch box 30c similar to the above-described VTR20.

In addition, the VDP 40 includes, as a sub-device, a video player 40a for reproducing an AV signal from an optical disk.

In this bi-directional bus system, e.g., video signals reproduced by VTR20, VTR30, VDP40 are delivered to the TV10 to display a picture based on this video signal on TV monitor 10b. In actual terms, the switch box 10d of the TV10 and the switch box 20c of the VTR20 are connected by an AV signal line L1, the switch box 10d of the TV10 and the switch box 30c of the VTR30 are connected by an AV signal line L2, and the switch box 10d of the TV10 and the video player 40a are connected by an AV signal line L3, viz., AV signal lines L1, L2, L3 are wired in a star form with the TV10 being as a center. Accordingly, AV signals reproduced by VTR20, VTR30, VDP40 are respectively delivered to the TV monitor 10b through AV signal lines L1, L2, L3 and switch box 10d. Thus, pictures corresponding thereto are displayed on the TV monitor 10b. Further, e.g., an AV signal reproduced by the video player 40a is delivered to video deck 20a through AV signal line L3, switch box 10d, AV signal line L1, and switch box 20c. Thus, they are recorded (image-recorded) onto a magnetic tape by video deck 20a.

Further, in this bi-directional bus system, e.g., the TV10 (device) controls, through the bi-directional bus 1, VTRs20, 30 and, VDP40 (devices), and video decks 20a, 30a, video player 40a, switch box 20c and, 30c (sub-devices) included therein.

Further, in this bi-directional bus system, VTR20, 30 and VDP40 send data indicating status, etc. thereof to TV10 through bi-directional bus 1 in a manner such that the data are divided into a plurality of frames (so called packet). TV10 displays various messages on its screen based on these data.

Figure 8:
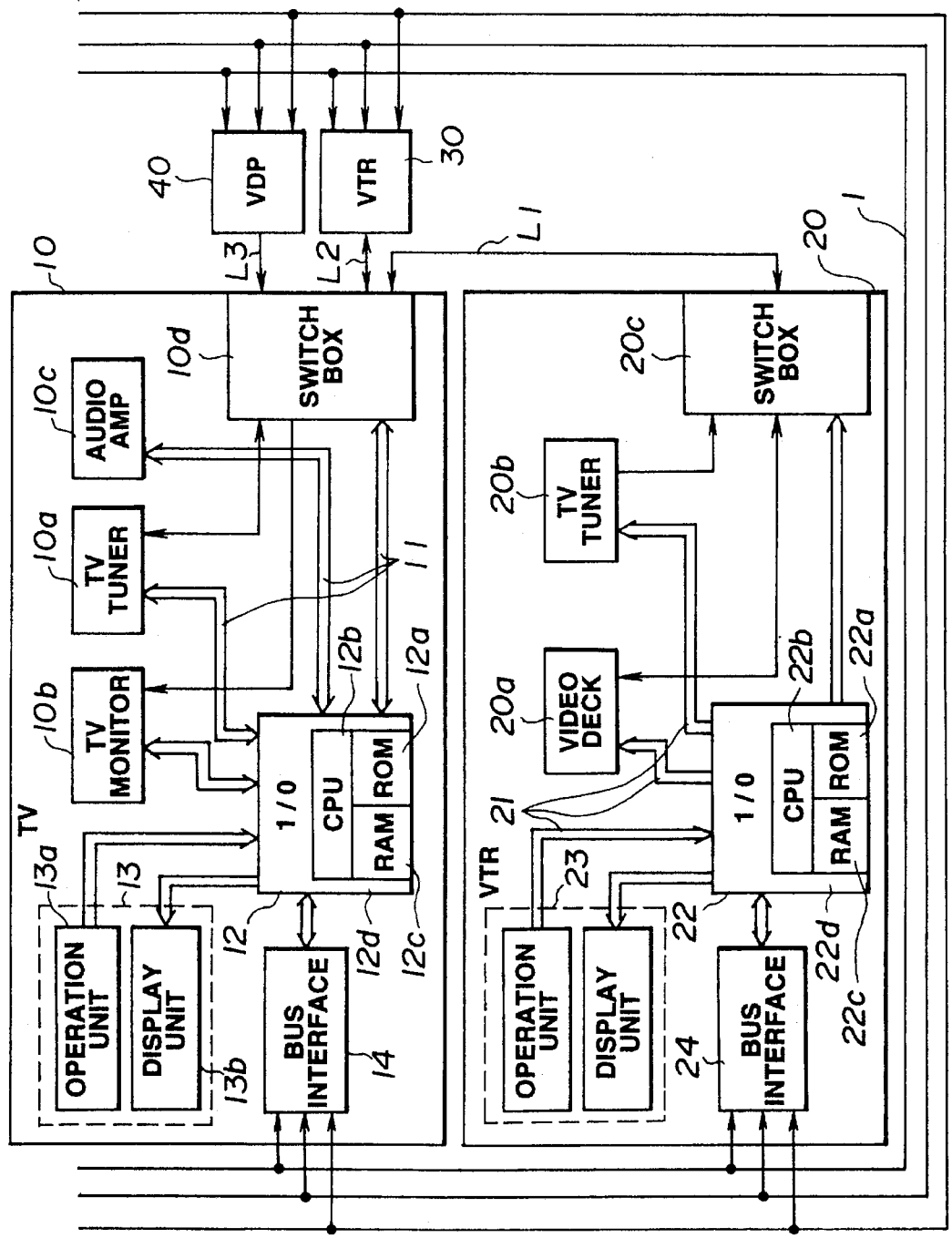
FIG. 8 is a block diagram showing an actual configuration of TV, VTR constituting the above-mentioned bi-directional bus system.

In this embodiment as shown in FIG. 8, TV10 includes a microprocessor 12 for controlling the tuners 10a~ switch box 10d through internal control bus 11, a user interface unit 13 for inputting operation contents operated by user to the microprocessor 12, and a bus interface circuit 14 for inputting a transmit signal consisting of control commands for controlling other devices and sub-devices thereof or data indicating status, etc. from the bi-directional bus 1 and outputting it thereto.

VTR20 includes a microprocessor 22 for controlling the video deck 20a~switch box 20c through an internal control bus 21, a user interface unit 23 for inputting operation contents operated by user to the microprocessor 22, and a bus interface circuit 24 for inputting a transmit signal from the bi-directional bus 1 or outputting it thereto. Further, VTR30 and VDP40 similarly include a microprocessor and a bus interface circuit (not shown), etc.

When a user operates the user interface unit 13 of TV10 for the purpose of viewing, on TV10, a picture based on a video signal reproduced by VTR20, microprocessor 12 of TV10 forms a transmit signal in accordance with an operation content to transmit this transmit signal to the VTR20 through bus interface circuit 14 and the bi-directional bus 1. The microprocessor 22 of VTR20 carries out a control to play (reproduce) the video deck 20a through internal control bus 21 on the basis of the transmit signal received by bus interface circuit 24, and controls the switch box 20c so that an AV signal reproduced by the video deck 20a is delivered to TV10.

Namely, the user interface unit 13 includes, as shown in the above-mentioned FIG. 8, an operation unit 13a provided with, e.g., a key switch, etc., and a display unit 13b provided with, e.g., a light emitting diode, etc. The operation unit 13a delivers a signal corresponding to an operation content that user has operated by using a key switch, etc. to microprocessor 12 through internal control bus 11.

The microprocessor 12 includes, as shown in the above-mentioned FIG. 8, a Read Only Memory (hereinafter referred to as ROM) for storing command tables used for converting received control commands to internal control commands for controlling the tuner 10a~switch box 10d or various programs such as a program for displaying a picture based on received data on TV monitor 10b, etc., a Central Processing Unit (hereinafter referred to as a CPU) for executing the program stored in the ROM12a, a Random Access Memory (hereinafter referred to as a RAM) 12c for storing result of the execution, or the like, and an I/O circuit 12d for interfacing with the tuner 10a~bus interface circuit 14.

CPU 12b executes program stored in ROM12b to thereby generate a control command for controlling, e.g., VTR20 on the basis of a signal delivered through internal control bus 11, I/O circuit 12d from operation unit 13a to deliver this control command to bus-interface circuit 14 as a frame structure.

Further, CPU 12b delivers data such as status, etc. to bus interface circuit 14 as a frame structure, and carries out a control to display, e.g., status message of VTR20 based on data received through bus interface circuit 14 on TV monitor 10b.

The bus interface circuit 14 employs, e.g., so called a CSMA/CD (Carrier Sense Multiple Access with Collision Detection) as an access system for the bi-directional bus 1, and is connected to the bi-directional bus 1 through a connector standardized, e.g., by so called IEC/SC48B (Secretariat) 202.

Figure 9:
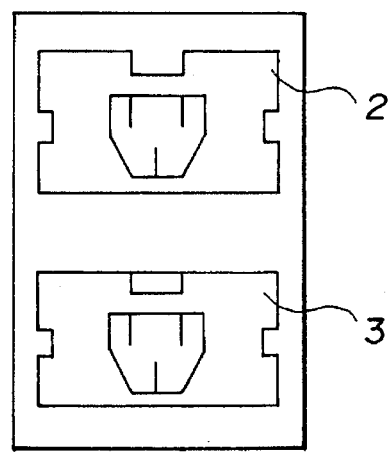
FIG. 9A is a view showing the physical structure of a connector of a bi-directional bus.
FIG. 9B is a schematic diagram showing the electrical system of a connector of a bi-directional bus.
Figure 9:
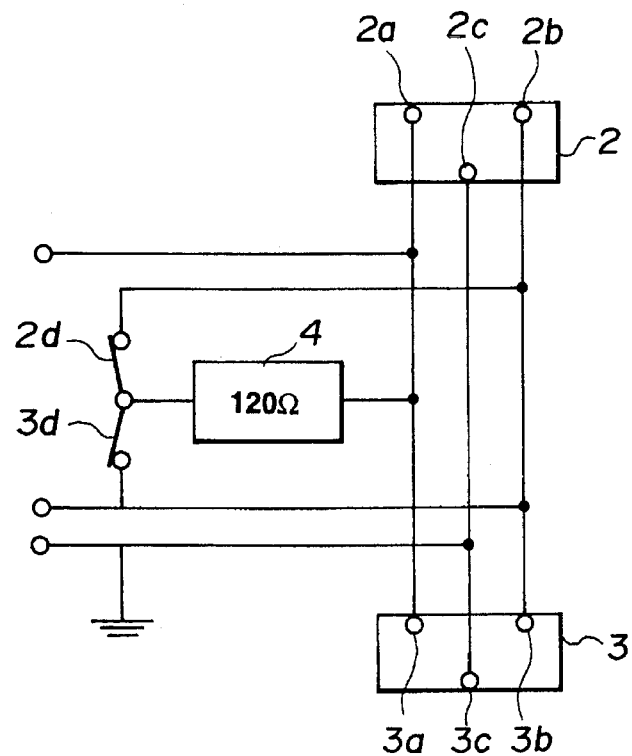

In more practical sense, this connector is provided with, as shown in FIG. 9A, two sockets 2, 3. As shown in FIG. 9B, contacts 2a, 2b for signal, a contact 2c for earth of the socket 2, and contacts 3a, 3b for signal and contact 3c for earth of the socket 3 are connected to each other within the connector. Further, contacts 2a and 2b are connected through a switch 2d and a terminating resistor (e.g., 120 m ohm) 4, and contacts 3a and 3b are connected through a switch 3d and the terminating resistor 4.

Connectors constructed in this way are respectively provided in every respective devices such as TV10, etc. Like connectors provided in the VTR20, for example, when a plug of the bi-directional bus 1 from the TV10 and a plug of the bi-directional bus 1 from the VTR30 are respectively inserted into sockets 2, 3, the switches 2d, 3d are opened so that the terminating resistor 4 is cut off. As a result, a transmit signal from TV10 is delivered to the bus interface circuit 24 of VTR20, and is delivered to VTR30 or VDP40 of the succeeding stage.

Figure 10:
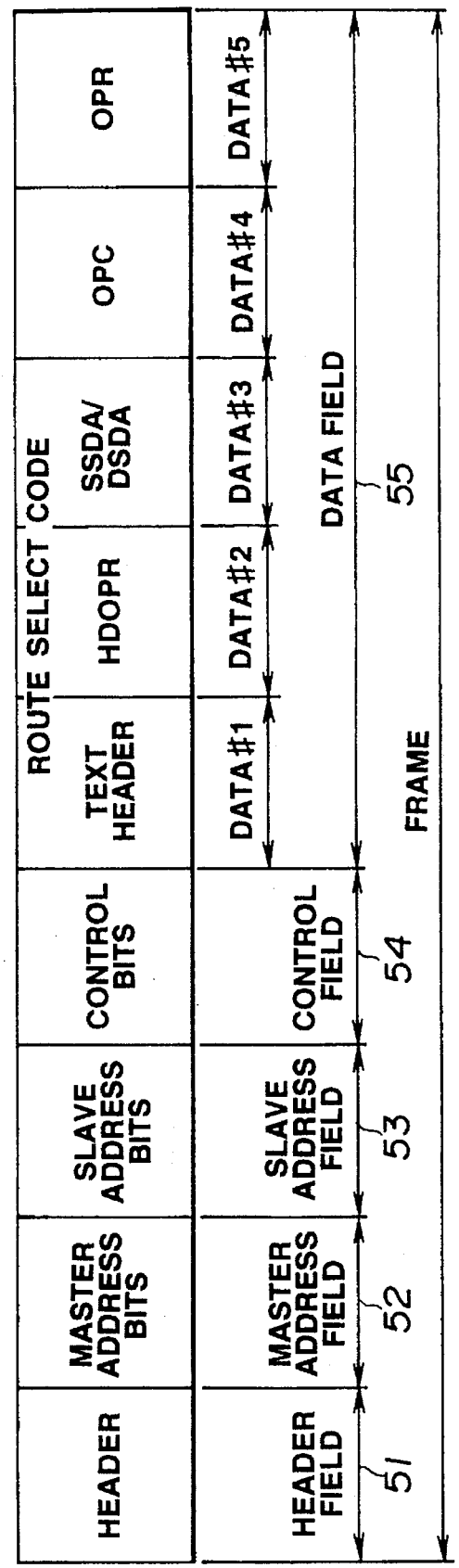
FIG. 10 is a view showing a frame format of a transmit signal for transmitting control command.
Figure 11:
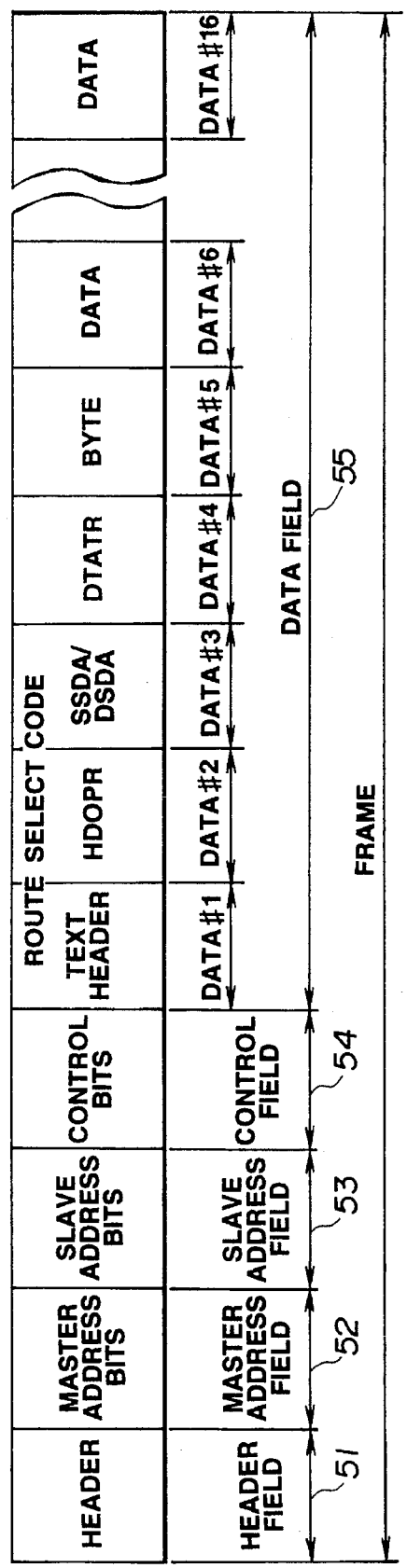
FIG. 11 is a view showing a format of a transmit signal for transmitting data.

The format of a transmit signal transmitted on the bi-directional bus 1 will now be described. The format of this transmit signal is substantially in conformity with the format of D2B described in the prior art, and control commands or data for controlling a destination sub-device, etc. or data for displaying on TV10 status, etc. have a frame structure as shown in FIGS. 10, 11. Thus, control commands or data of such frame structure are transmitted.

Namely, one frame consists of a header field 51 for specifying the header indicating the leading portion of the frame, a master address field 52 for specifying a master device address, a slave address field 53 for specifying a slave device address, a control field 54 for specifying a control bit indicating a communication, etc. in the state where slave device is locked, or in the state where the slave device is unlocked, and a data field 55 for specifying control commands or data.

Figure 1:
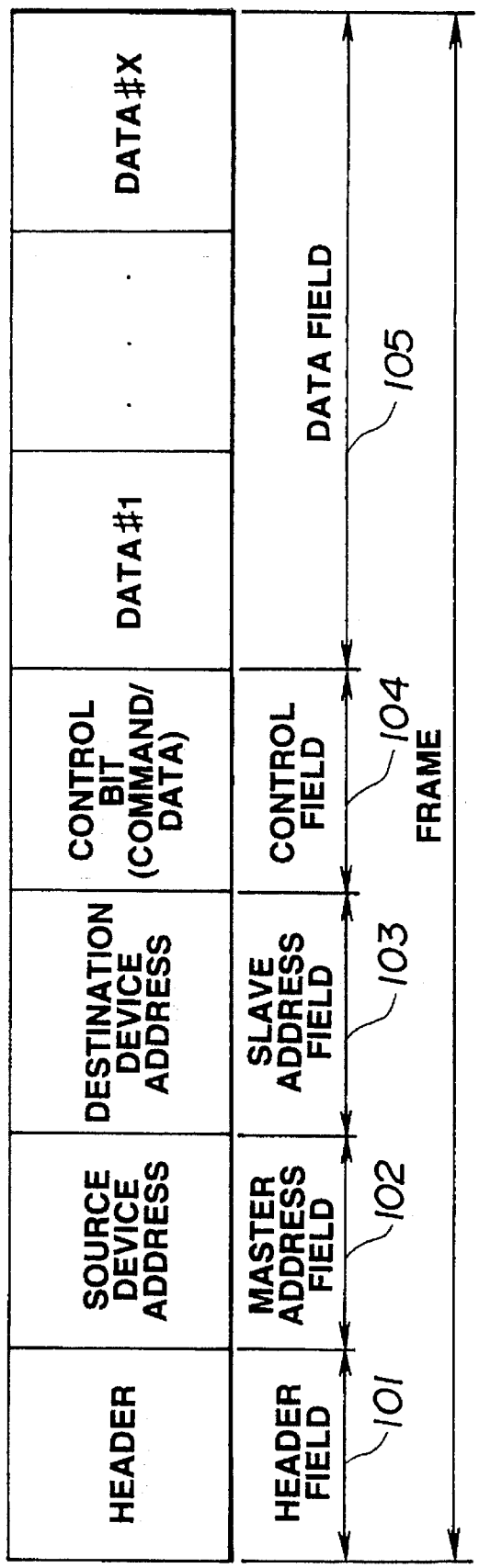
FIG. 1 is a view showing a conventional D2B frame format.
Figure 2:
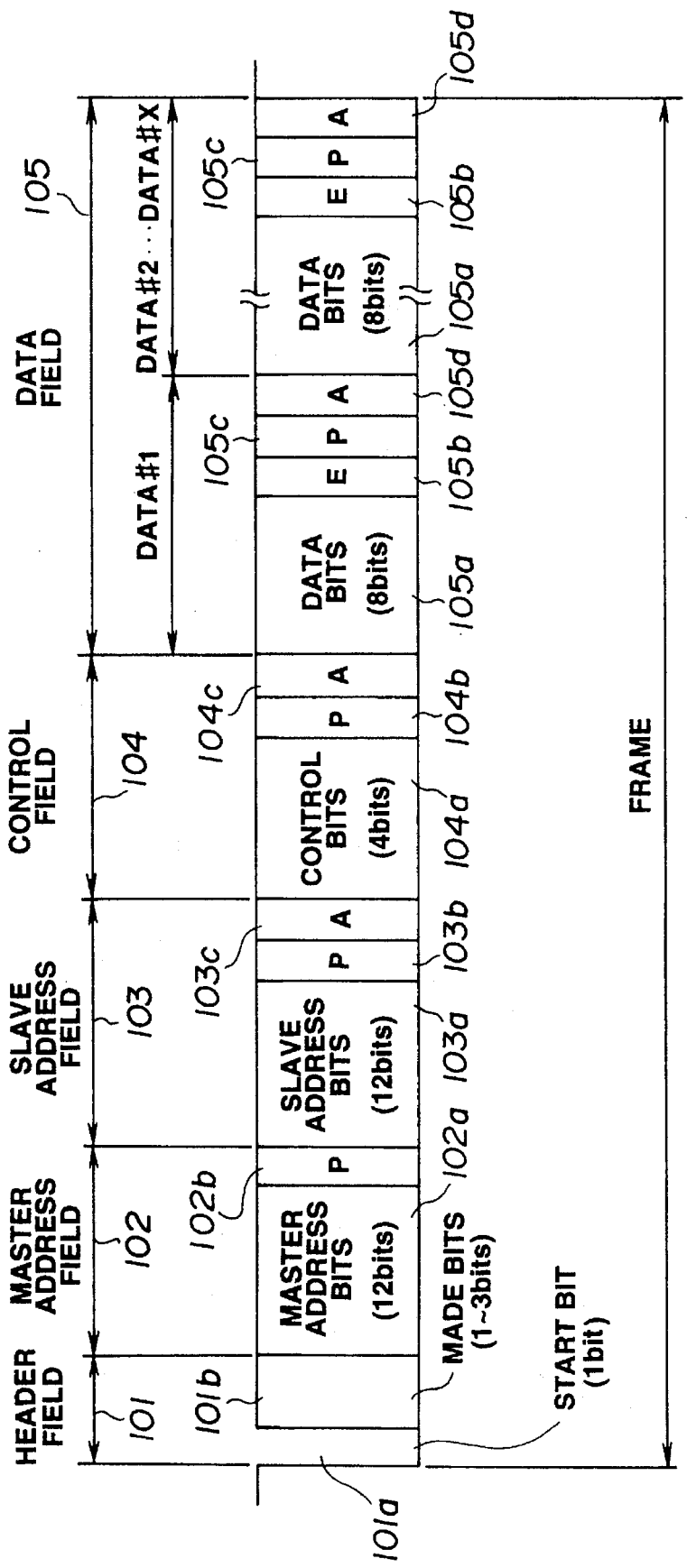
FIG. 2 is a view showing the detail of the conventional D2B frame format.
Figure 4:
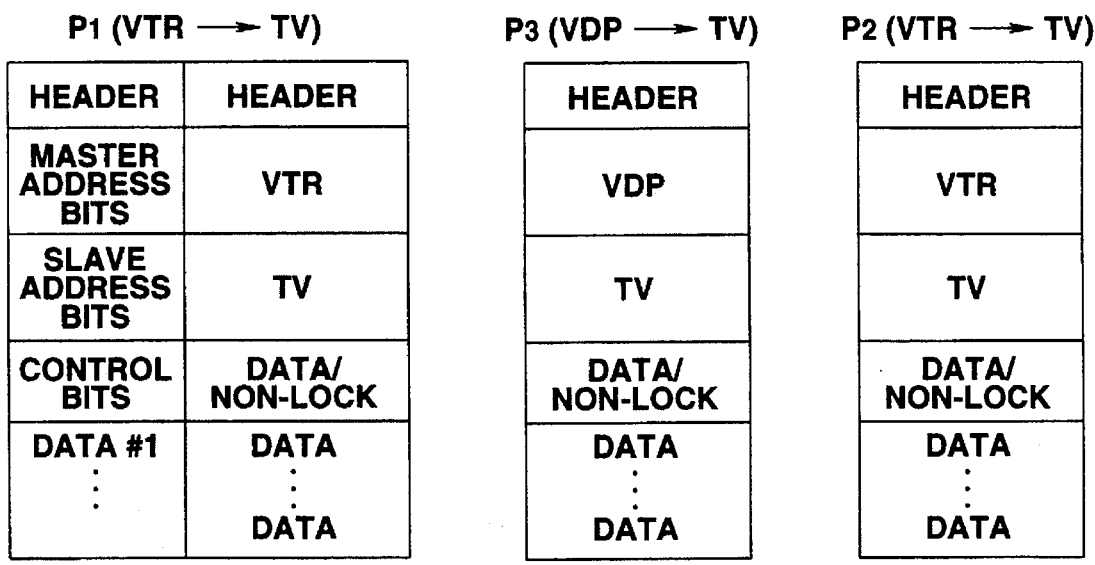
FIG. 4 is a view showing a conventional communication procedure (protocol) in unlock state.

The header of the header field 51 is in conformity with the D2B described in the prior art (see FIG. 2), and consists of a start bit of 1 bit for providing synchronization, and mode bits for prescribing a transmission speed or the number of bytes of the data field 55.

The master device address of the master address field 52 is in conformity with the D2B described in the prior art, and consists of master address bits of 12 bits for specifying a master device address, and a parity bit of 1 bit.

The slave device address of the slave address field 53 is in conformity with the D2B described in the prior art, and consists of slave address bits of 12 bits for specifying a slave device address, and an acknowledge bit of one bit for returning acknowledgment from the slave device.

To the control field 54, substantially in conformity with the D2B described in the prior art, control bits of 4 bits for specifying whether the data field 55 is control command or data, a parity bit of 1 bit, and an acknowledge bit of 1 bit are assigned. It is to be noted that as the control bit, there are used only code "E"h (h indicates hexadecimal number) indicating write in unlock state of control command, code "B"h indicating write in lock state of data, and code "F"h indicating write in unlock state of data, which are codes from master to slave of codes standardized in D2B.

In the data field 55, data bits of 8 bits, end of data bit of 1 bit, parity bit of 1 bit, and acknowledge bit of 1 bit are repeated as many as necessary substantially in conformity with the D2B described in the prior art. When data bits are data #1, #2, #3 . . . from the beginning in this order, a route select code indicating a communication from a sub-device included in a device to any other device, a communication from a device to a sub-device included in any other device, or a communication from a device to any other device is assigned to data #1~data #3 as shown in the above-mentioned FIGS. 10, 11.

This route select code consists of, as shown in the above-described FIGS. 10, 11, a text header of 8 bits, a header operand comprised of 8 bits indicating communication from sub-device included in device to any other device, communication from device to sub-device included in any other device, or communication from device to any other device, and a sub-device address comprised of 8 bits indicating a Source Sub-Device Address (hereinafter referred to as SSDA) or Destination Sub-device Address (hereinafter referred to as DSDA). The text header is assigned to data #1 as "AB"h to discriminate from OPC "Begin 2" (code "BD"h), OPC "Begin 1" ("BC"h), OPC "Begin 0" ("BB"h) used in the conventional D2B.

The header operand (hereinafter referred to as HDOPR) subsequent to the text header is assigned to data #2. For example, as shown in FIG. 12, by bits b1, b0 of the least significant 2 bits (b7 is the most significant bit (MSB)), communication from sub-device included in device to any other device (hereinafter referred to as communication from sub-device to device), communication from device to sub-device included in any other device (hereinafter referred to as communication from device to sub-device), or communication from device to any other device is designated. In more practical sense, b1=0, b0=1 indicates communication from sub-device to device, b1=1, b0=0 indicates communication from device to sub-device, and b1=1, b0=1 indicates communication from device to device. Namely, in this bi-directional bus system, communication from a sub-device included in a device to a sub-device included in any other device used in the conventional D2B is not carried out. In other words, HDOPR where b1=0 and b0=0 is not used.

For communication of control commands, as shown in the above-mentioned FIG. 10, control commands, etc. are assigned to data #4 and data subsequent thereto. On the other hand, in communication of data, as shown in the above-mentioned FIG. 11, Data Attribute (hereinafter referred to as DTATR) for identifying, e.g., so called ASCII code, On Screen Data (hereinafter referred to as OSD) for displaying character, etc. on TV monitor, Japanese OSD data, transparent transfer data for transferring an instruction sent from a remote controller to other device as it is, or the like is assigned to data #4, the number of bytes of data (hereinafter referred to as BYTE) included in that frame is assigned to data #5 by codes "20"h~"2F"h respectively corresponding to, e.g., 1 byte~16 bytes, and data are assigned to data #6, #7, #8 . . . and #16 with a byte being as a data unit.

Meanwhile, for communication of data, if data capacity of data field 55 is 16 bytes and a quantity of data transmitted is more than 16 bytes, transmit data is divided into a plurality of frames, and control bits of the above-described control field 54 of the first frame are designated so that a device on the receiving side is locked, i.e., are set to code "B"h indicating writing data in lock state. Control bits in the last frame are designated so that device on the receiving side is unlocked, i.e., is set to code "F"h indicating write in non-lock state of data. It is to be noted that when a data quantity of the data can be less than data capacity of the data field 55, and data to be transmitted is transmitted by one frame, control bits indicate that a device on the receiving side is unlocked, i.e., are set to code "F"h indicating writing data in unlock state.

Accordingly, for carrying out communication of control commands, e.g., for sending a control command for playing, e.g., video deck 20a from TV10 (device) to video deck 20a (sub-device) included in VTR20 (other device), microprocessor 12 of TV10 assigns an address of TV10 as master address bits to the master address field 52, assigns an address of VTR20 as slave address bits to the slave address field 53, and assigns code "E"h indicating write of the control command from master to slave to the control field 54 as control bits. Further, the microprocessor 12 assigns code "AB"h as a text header to data #1, assigns a code (b1=1, b0=0) indicating communication from device to sub-device to data #2 as HDOPR, and assigns an address of video deck 20a to data #3 as DSDA. Further, the microprocessor 12 assigns code "C3"h for playing, e.g., the video deck to data #4 subsequent thereto as OPC, and assigns code "75"h indicating forward to data #5 as OPR.

In addition, for transmitting, e.g., from TV (device) to VTR20 (device), a control command to turn off a power supply, microprocessor 12 assigns code (b1=1, b0=1) indicating communication from device to device to data #2 as HDOPR. In this case, since an address of the sub-device is unnecessary, microprocessor 12 assigns a dummy code, e.g., code "7F"h to data #3. Further, the microprocessor 12 assigns, e.g., code "AO"h indicating standby to data #4 as OPC, and assigns code "70"h indicating ON to data #5 as OPR.

On the other hand, for communication of data, e.g., for transmitting data indicating status, etc. of video deck 20a (sub-device) from VTR20 to TV10 in a plurality of frames, e.g., two frames P1, P2 to display a picture based on those data on TV10, microprocessor 22 of VTR 20 assigns, as shown in FIG. 13, for example, address of VTR20 to the master address field 52 as master address bits, assigns address of TV10 to the slave address field 53 as slave address bits, and assigns code "B"h indicating write in lock state of data from master to slave to the control field 54 as control bits.

Further, the microprocessor 22 assigns code "AB"h to data #1 as text header, assigns code (b1=0, b0=1) indicating communication from sub-device to device to data #2 as HDOPR, and assigns address of video deck 20a to data #3 as SSDA.

Further, microprocessor 22 assigns code "20"h indicating, e.g., OSD data to data #4 as DTATR, and assigns code "2A"h indicating e.g., that data of one byte is included in this frame to data #5 as BYTE.

Further, microprocessor 22 assigns code "20"h indicating, e.g., first line on screen to data #6 as OPR1, assigns code "22"h e.g., indicating a character of the standard size to data #7 as OPR2, and assigns code "21"h indicating, e.g., small letter (character) of alphabet to data #8 as OPR3.

Then, microprocessor 22 assigns data to be transmitted to data #9~data #16 every byte. Thus, a frame P1 transmitted first is formed.

At a frame P2 transmitted last, as shown in the above-mentioned FIG. 13, microprocessor 22 assigns address of VTR20 to master address field 52 as master address bits, assigns address of TV10 to slave address field 53 as slave address bits, and assigns code "F"h indicating writing data in unlock state from master to slave to control field 54 as control bits.

Further, microprocessor 22 assigns code "AB"h to data #1 as text header, assigns code (b1=0, b0=1) indicating communication from sub-device to device to data #2 as HDOPR, and assigns address of video deck 20a to data #3 as SSDA.

In addition, microprocessor 22 assigns code "20"h indicating, e.g., OSD data to data #4 as DTATR, and assigns code "27"h indicating that data of 8 bytes are included in this frame to data #5 as BYTE.

Meanwhile, when, e.g., display condition on screen is not changed, i.e., character of the same size, etc. is displayed on the same line, the above-described OPR1~OPR3 become unnecessary. Microprocessor 22 assigns data to be transmitted to data #6~data #13 every bytes. Thus, as shown in the above-mentioned FIG. 13, a frame P2 transmitted last is formed.

For communication of data having a data quantity not greater than data capacity of the data field, the data can be transmitted, e.g., from VTR20 to TV10 by one frame P1, as shown in FIG. 14, for example, microprocessor 22 of VTR20 assigns address of VTR20 to master address field 52 as master address bits, assigns address of TV10 to slave address field 53 as slave address bits, and assigns code "F"h indicating writing data in unlock state from master to slave to control field 54 as control bits.

Further, microprocessor 22 assigns code "AB"h to data #1 as text header, assigns code (b1=0, b0=1) indicating communication from sub-device to device to data #2 as HDOPR, and assigns address of video deck 20a to data #3 as SSDA.

Further, microprocessor 22 assigns code "20"h indicating, e.g., OSD data to data #4 as DTATR, assigns code "2A"h indicating that byte of 11 bytes are included in this frame to data #5 as BYTE.

Further, microprocessor 22 assigns code "20"h indicating, e.g., first line on screen to data #6 as OPR1, assigns code "21"h indicating, e.g., large letter (character) to data #7 as OPR2, and assigns code "20"h indicating, e.g., capital of alphabet to data #8 as OPR3.

Then, microprocessor 22 assigns data to be transmitted to data #9~data~#16 every byte. Thus, a frame P1 when data is transmitted by one frame is formed.

Figure 15:
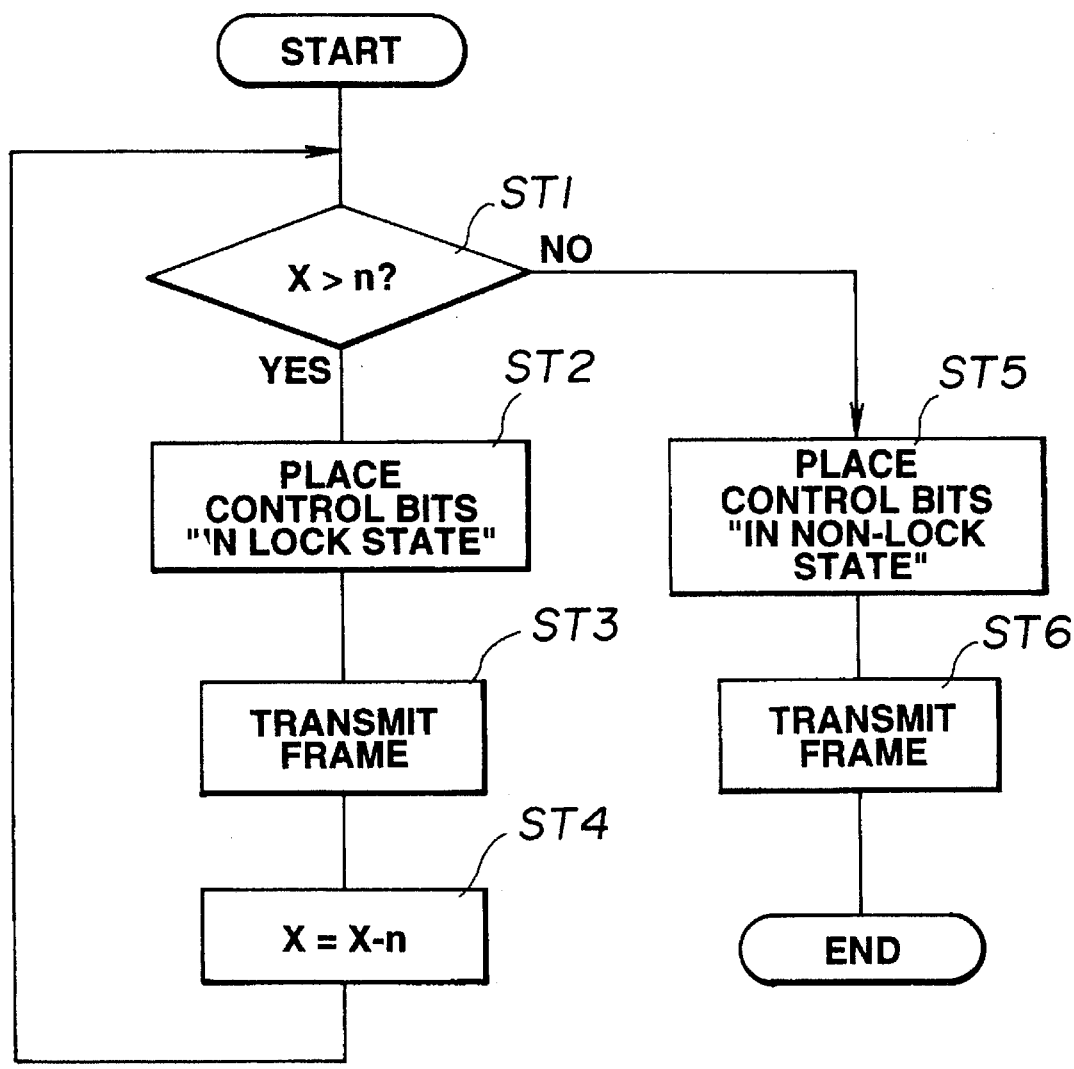
FIG. 15 is a flowchart for explaining the operation of a microprocessor of VTR constituting the bi-directional bus system.

Namely, when it is assumed that data quantity of data to be transmitted is X, and a data capacity which can be transmitted by one frame is n, microprocessor 22 forms a frame in accordance with the flowchart shown in FIG. 15.

At step ST1, microprocessor 22 judges whether or not data quantity X is greater than data capacity n. As a result, if so, the operation proceeds to step ST2. If not so, the operation proceeds to step ST5.

At step ST2, microprocessor 22 places control bits in lock state to form a frame. Then, the operation proceeds to step ST3.

At the step ST3, microprocessor 22 sends the frame formed at the step ST2. Then, the operation proceeds to step ST4.

At step ST4, data capacity n is subtracted from data quantity X so that the value obtained by subtraction becomes a new data quantity X, i.e., the remaining data quantity X. Then, the operation returns to the step ST1.

On the other hand, at step ST5, microprocessor 22 places control bits in unlock state to form a frame. Then, the operation proceeds to step ST6.

At the step ST6, microprocessor 22 sends the frame formed at the step ST5. The operation is completed. For transmitting data in a plurality of frames, microprocessor 22 carries out formation of a frame such that frames from the first frame to the second from last frame are in lock state and the frame transmitted last is in unlock state. Further, in transmitting data in a single frame, microprocessor 22 forms a frame in which that frame is in unlock state.

As stated above, in this bi-directional bus system, a frame allowing a slave (receiving side) device to be in lock state before actual data is transmitted and a frame allowing data on the receiving side to be placed in unlock state at the time when transmission of data is completed, which were required in the conventional bi-directional bus system, are unnecessary. Accordingly, the data traffic quantity can be reduced to much more degree as compared to the conventional system. Thus, the transmission efficiency can be improved. In addition, the communication procedure can be simplified.

A transmit signal having frame structure as described above is delivered from the microprocessor 12 of TV 10 to interface circuit 14, or delivered from microprocessor 22 of VTR20 to bus interface circuit 24. These bus interface circuits 14, 24 detect presence or absence of so called a carrier on the bi-directional bus 1 to transmit the transmit signal to TV10, VTR20, 30 and VDP40, etc. through the bi-directional bus 1 when there is no carrier, i.e., the bi-directional bus 1 is open.

In transmission of control command from TV10 to VTR20, for example, bus interface circuit 24 of VTR20 receives transmit signal through bi-directional bus 1, and delivers the received transmit signal to microprocessor 22. The microprocessor 22 executes program (software) stored in, e.g., ROM 22a to detect, from the transmit signal, the route select code inserted at a predetermined position of the data field 55 to detect on the basis of the detected route select code whether communication carried out is communication from sub-device included in device to any other device, communication from device to sub-device included in any other device,. or communication from device to any other device.

In actual terms, microprocessor 22 detects, on the basis of master address bits of the master address field 52 and slave address bits of the slave address field 53 of the transmit signal, that this transmit signal is a transmit signal for the microprocessor 22 from, e.g., TV10, and detects, on the basis of the code of the control field 54, write of control command from master to slave by, e.g., code "E"h. It is to be noted that microprocessors of VTR30 and VDP40 detect that a current communication is not a communication for VTR or VDP from the fact that the slave address bits do not correspond to their own addresses, thus not to carry out the operation corresponding to that transmit signal.

Further, microprocessor 22 detects, on the basis of the text header assigned to data #1 of the data field 55, that a current code is not OPC "Begin 2" (code "BD"h), OPC "Begin 1" ("BC"h), or OPC "Begin 0" ("BB"h) used in the conventional D2B by, e.g., code "AB"h, and detects the kind of communications on the basis of HDOPR assigned to data #2; when the lower order 2 bits are 1, 0 (b1=1, b0=0), microprocessor 22 detects that a current communication is communication from device to sub-device; when those bits are b1=0, b0=1, it detects that current communication is communication from sub-device to device, and when those bits are b1=1, b0=1, it detects that current communication is communication from device to device. Namely, even if a transmit signal in conformity with the conventional D2B is transmitted through the same bi-directional bus 1, discrimination therebetween can be made.

At the time of communication from device to sub-device, microprocessor 22 recognizes that DSDA is assigned to data #3. At the time of communication from sub-device to device, microprocessor 22 recognizes that SSDA is assigned to data #3. Further, at the time of communication from device to device, the microprocessor 22 recognizes that data #3 is dummy code "7F"h. In addition, microprocessor 22 specifies, on the basis of DSDA assigned to, e.g., data #3, that a current control is, e.g., control for video deck 20a.

Meanwhile, respective equipments (devices) such as VTR20, etc. have a command table for converting control commands to internal control commands for controlling sub-devices that those devices include therein, thus to convert (decode) the same control command to internal control command of control contents corresponding to various controlled system sub-devices. In more practical sense, in ROM 22a of the microprocessor 22, for example, a deck/player command table for video deck 20a, and a tuner command table for tuner 20b are stored. The microprocessor 22 decodes control commands assigned to data #4, #5 of the data field 55 into internal control commands for controlling the video deck 20a~switch box 20c on the basis of these command tables to control the video deck 20a~switch box 20c through the internal control bus 21 on the basis of the internal control commands. Namely, e.g., in OPC of the control commands, code "CO"h means a repeat in the deck/player command, means control of the band in the tuner command, means control of contrast in the video command, and means control of volume in the audio command. In other words, a command table determined by a default value of a sub-device specified by DSDA is used. As a result, code of the same control command can be commonly used for different meanings for various sub-devices. Thus, the control command can be shortened.

For example, when DSDA is video deck 20a, OPC of the control command is code "C3"h, and OPR is code "75"h, microprocessor 22 of VTR20 decodes the control command into an internal control command indicating play and forward by using the deck/player command table to carry out a control so that the video deck 20a conducts a reproducing operation through the internal control bus 21, and to carry out a control so that an AV signal from the video deck 20a is delivered to the switch box 10d of TV10 through switch box 20c. In this way, communication from TV10 (device) to video deck 20a (sub-device) of VTR20 is carried out. Thus, user can view, on TV10, a picture based on the AV signal reproduced by the VTR20.

On the other hand, in transmitting data indicating status of video deck 20a, e.g., from VTR20 to TV10 described above, bus interface circuit 14 of TV10 receives a transmit signal through bi-directional bus 1, and delivers the received transmit signal to microprocessor 12. The microprocessor 12 executes program (software) stored in ROM 12a to detect a route select code inserted at a predetermined position of data field 55 from the transmit signal to detect on the basis of the detected route select code whether a current communication is communication from a sub-device included in a device to any other device, communication from a device to a sub-device included in any other device, or communication from a device to any other device.

In actual terms, microprocessor 12 detects on the basis of master address bits of the master address field 52 and slave address bits of the slave address field 53 of a transmit signal, that this transmit signal is, e.g., a transmit signal for microprocessor 12 from VTR20, and detects on the basis of the code of the control field 54 that a write operation is writing data in a lock state when corresponding code is, e.g., code "B"h and that a write operation is writing data in unlock state when corresponding code is code "F"h. Namely, when data is transmitted in a plurality of frames, microprocessor 12 detects that a current write operation is a write operation in lock state from the first frame and write operation in unlock state the last frame. Further, when data is transmitted in one frame, microprocessor 12 detects that a current write operation is a write operation in unlock state at that frame. When microprocessor 12 receives the first frame of a transmit signal delivered from a first device, e.g., VTR20, it is placed in lock state. When microprocessor 12 receives a transmit signal from a second device, e.g., VDP40, it neglects that received signal (allows that received signal to be invalid), and informs VDP40 that corresponding device is in lock state (locked) as described later.

Further, microprocessor 12 detects on the basis of text header assigned to data #1 of data field 55 that a current code is not OPC "Begin 2" (code "BD"h), OPC "Begin 1" ("BC"h), or OPC "Begin 0" ("BB"h), and detects on the basis of HDOPR assigned to data #2, that when the least significant two bits are 1, 0 (b1=1, b0=0), a current communication is communication from device to sub-device, that when those bits are b1=0, b0=1, a current communication is communication from sub-device to device, and that when those bits are b1=1, b0=1, a current communication is communication from device to device.

Further, microprocessor 12 recognizes that DSDA is assigned to data #3 when a current communication is communication from device to sub-device, that SSDA is assigned to data #3 when a current communication is communication from sub-device to device, and that data #3 is dummy code "7F"h when a current communication is communication from device to device. Further, microprocessor 12 specifies current data as data from, e.g., video deck 20a on the basis of SSDA assigned to data #3, for example.

Further, microprocessor 12 discriminates the kind of data assigned to data #9≠data #16, for example, on the basis of DTATR assigned to data #4. In more practical sense, microprocessor 12 recognizes that when a current code is, e.g., code "20"h, received data is ASCII code, OSD data, that when a current code is, e.g., code "21"h, received data is Japanese OSD data, and that when a current code is, e.g., code "22"h, received data is transparent transmit data.

Further, microprocessor 12 detects the number of bytes of data transmitted at this frame on the basis of BYTE assigned to data #5. In more practical sense, microprocessor 12 detects 1~byte 16 bytes respectively in correspondence with codes "20"h~"2F"h, for example. Namely, microprocessor 12 can recognize in advance data quantity of data included in frame, thus making it possible to simplify processing (software) for judging the end of that frame.

Further, microprocessor 12 detects on the basis of OPR1 assigned to data #6 on which line of TV monitor 10b display is carried out. In more practical sense, microprocessor 12 detects the first line, the second line, the third line . . . respectively in correspondence with codes "20"h, "21"h, "22"h . . . .

Further, microprocessor 12 detects the size of a character displayed on TV monitor 10b on the basis of OPR2 assigned to data #7. In more practical sense, microprocessor 12 detects that when a current code is code "20"h, a character displayed is a character of the standard size, and that when a current code is code "21"h, a character displayed is a large letter (character).

Further, microprocessor 12 detects capital or small letter (character) of alphabet on the basis of OPR3 assigned to data #8. In more practical sense, microprocessor 12 detects that when a current code is, e.g., code "20"h, a corresponding character is large letter (character), and when a current code is, e.g., code "21"h, a corresponding character is a small letter (character). It is to be noted that when data is divided into a plurality of frames and display condition on screen is not changed, i.e., a character of the same size, etc. is displayed on the same line, these OPR1~OPR3 are received only at the first frame, and are not received at the subsequent frames.

Further, microprocessor 12 carries out a control to display, under the condition designated by the above-described OPR1~OPR3, characters, etc. based on data assigned to data #9~data #16 on TV monitor 10b. Thus, communication of data indicating status, etc. from video deck 20a (sub-device) of VTR20 to TV10 is carried out. One can view the operating state of, e.g., VTR20 on TV10.

Suppose that VDP 40 waits until the bi-directional bus 1 is opened in order to transmit data to TV10 for a time period during which VTR20 is transmitting frame P1. If VTR has transmitted frame P1 thereafter to stop sending of carrier, VDP40 detects there is no carrier on the bi-directional bus 1 to acquire the right of use of the bi-directional bus 1 to transmit, as shown in FIG. 13, to TV10, frame P3 in which master address bits, slave address bits and control bits are respectively an address of VDP40, an address of TV10, code "F"h (data/non-lock); and code "AB"h, code indicating communication from sub-device to device, address of video player, code "20"h (OSD data), code "2A"h (11 bytes), code "20"h (first line), code "22"h (standard character), and code "21"h (small letter (character) of alphabet) are respectively assigned to data #1 (text header), data #2 (HDOPR), data #3 (SSDA), data #4 (DATAR), data #5 (BYTE), data #6 (OPR1), data #7 (OPR2); and data #8 (OPR3), and data are assigned to data #9~data #16.

Microprocessor 12 receives this frame P3, but detects on the basis of slave address bits (address of VDP40) that frame P3 is not a frame from VTR20, and disregards frame P3. Since microprocessor 12 is locked because it receives frame P1 from VTR20, it informs VDP40 that it is locked. In more actual sense, microprocessor 12 sends back acknowledgement with respect to control bits of frame P3 received from VDP40 as so called NACK indicating TV10's failure to receive frame P3. Then, VDP40 stops transmission of data upon a receipt of NACK. As a result, microprocessor 12 can receive data from VTR20 without being interrupted.

When transmission of data from VTR20 to TV10 is completed, i.e., after frame P2 placing TV10 in unlock state is transmitted as shown in the above-mentioned FIG. 13, VDP40 transmits frame P3 to TV10 for a second time.

On the other hand, when a data quantity of data transmitted is not greater than data capacity of the data field and VTR20 is transmitting data in a single frame as shown in the above-mentioned FIG. 14, VTR20 is placed in unlock state as described above. Accordingly, when transmission of frame P1 from VTR20 is completed and the bi-directional bus becomes open, VDP40 can immediately transmit frame P2.

It is to be noted that this invention is not limited to the above-described embodiment, but can be applied to, e.g., a communication to send a request from a device to a sub-device to send an answer from sub-device back to device, e.g., a communication for automatically informing the status of device, or the like. In addition, it is needless to say that this invention can be applied to, e.g., a bi-directional bus system adapted to control AV equipment, etc. except for D2B or HBS.

As apparent from the foregoing description, in accordance with this invention, for transmitting data having a data quantity greater than data capacity of the data field in a plurality of frames, the transmitting method comprises: giving an indication to lock a device on the receiving side at a frame transmitted first to control field of a transmit signal consisting of address field, the control field and data field; giving an indication to unlock the device on the receiving side at a frame transmitted last to control field of the transmit signal; and transmitting the transmit signal through the bi-directional bus. As a result, a frame placing a device on the receiving side in a lock state before actual data is transmitted and a frame placing a device on the receiving side in unlock state at the time when transmission of data is completed, which were required in the conventional bi-directional bus system, are unnecessary. Accordingly, the data traffic quantity can be reduced to much more degree as compared to the conventional system. Thus, the transmission efficiency can be improved. In addition, the communication procedure can be simplified.

Further, in this invention, for transmitting data having a data quantity not greater than data capacity of data field in a single frame, the transmitting method comprises: giving an indication to unlock a device on the receiving side to the control field of a transmit signal; and transmitting the transmit signal through the bi-directional bus. As a result, a frame placing a device on the receiving side in a lock state before actual data is transmitted and a frame placing a device on the receiving side in unlock state at the time when transmission of data is completed, which were required in the conventional bi-directional bus system, are unnecessary. Accordingly, the data traffic quantity can be reduced to much more degree as compared to the conventional system. Thus, the transmission efficiency can be improved. In addition, the communication procedure can be simplified.

In addition, in this invention, the communication method comprises: receiving, though bi-directional bus, a transmit signal consisting of address field, control field and data field, and such that an indication to carry out communication either in state where device on the receiving side is locked or in the state where device on the receiving side is unlocked is given to the control field, whereby when indication to lock device on the receiving side is given to the control field of a transmit signal from a first device, in the case where a transmit signal is received from a second device, the second device is informed through the bi-directional bus that the device on the receiving side is locked. As a result, the second device stops transmission of a transmit signal, thus making it possible to receive the transmit signal from the first device without being interrupted.

What is claimed is:

1. A communication method for enabling a plurality of devices to communicate with each other through a bi-directional bus, communication among said devices being made with a frame being a transmission unit, wherein each frame comprises:

a master address field provided for an address of a master device which sends transmit data having a total quantity x of data;

a slave address field provided for an address of a slave device which receives said transmit data sent from said master device;

a control field provided for a control data to indicate whether said slave device should be locked or unlocked, said slave device accepting communication only from a first master device if said first master device locks said slave device; and a data field provided for said transmit data, said data field having predetermined capacity n of data, said communication method comprising the steps of:

transmitting said transmit data having said total quantity x of data in a plurality of frames through said bi-directional bus when said x is greater than said n, the number of said plurality of frames being the minimum number necessary to transmit said total quantity x of data, wherein said control data of the first frame of said plurality of frames is set to indicate that said slave device should be locked and wherein said control data of the last frame of said plurality of frames is set to indicate that said slave device should be unlocked; and transmitting said transmit data having said total quantity x of data in a single frame through said bi-directional bus when said x is not greater than said n, wherein said control data of said single frame is set to indicate that said slave device should be unlocked.

2. The communication method according to claim 1, wherein when a second master device tries to communicate with said slave device while said slave device is locked by said first master device, said slave device informs said second master device through said bi-directional bus that said slave device is locked.

3. A bi-directional bus system comprising:

a bi-directional bus; and a plurality of devices to communicate with each other through said bi-directional bus, each of said plurality of devices comprising:

transmit signal formation means for forming a transmit signal having a total quantity x of data in a frame structure comprising:

a master address field provided for an address of a master device which sends said transmit signal;

a slave address field provided for an address of a slave device which receives said transmit signal sent from said master device;

a control field provided for a control data to indicate whether said slave device should be locked or unlocked, said slave device accepting communication only from a first master device if said first master device locks said slave device; and a data field provided for said transmit signal, said data field having predetermined capacity n of data; and bus output means for outputting said transmit signal having said total quantity x of data to said bi-directional bus, said bus output means outputting said transmit signal in a plurality of frames when said x is greater than said n, the number of said plurality of frames being the minimum number necessary to transmit said total quantity of data, wherein said control data of the first frame of said plurality of frames is set to indicate that said slave device should be locked and wherein said control data of the last frame of said plurality of frames is set to indicate that said slave device should be unlocked, and outputting said transmit signal in a single frame when said x is not greater than said n, wherein said control data of said single frame is set to indicate that said slave device should be unlocked.

4. The bi-directional bus system according to claim 3, wherein when a second master device tries to communicate with said slave device while said slave device is locked by said first master device, said slave device informs said second master device through said bi-directional bus that said slave device is locked.

5. A communication device for communicating with other devices through a bi-directional bus, comprising:

transmit signal formation means for forming a transmit signal having a total quantity x of data in a frame structure comprising:

a master address field provided for an address of a master device which sends said transmit signal;

a slave address field provided for an address of a slave device which receives said transmit signal sent from said master device;

a control field provided for a control data to indicate whether said slave device should be locked or unlocked, said slave device accepting communication only from a first master device if said first master device locks said slave device; and a data field provided for said transmit signal, said data field having predetermined capacity n of data; and bus output means for outputting to said bi-directional bus said transmit signal having said total quantity x of data, said bus output means outputting said transmit signal in a plurality of frames when said x is greater than said n, the number of said plurality of frames being the minimum number necessary to transmit said total quantity x of data wherein said control data of the first frame of said plurality of frames is set to indicate that said slave device should be locked and wherein said control data of the last frame of said plurality of frames is set to indicate that said slave device should be unlocked, and outputting said transmit signal in a single frame when said x is not greater than said n, wherein said control data of said single frame is set to indicate that said slave device should be unlocked.

6. The communication device according to claim 5, wherein when a second master device tries to communicate with said slave device while said slave device is locked by said first master device, said slave device informs said second master device through said bi-directional bus that said slave device is locked.

* * * * *